Figure 1:
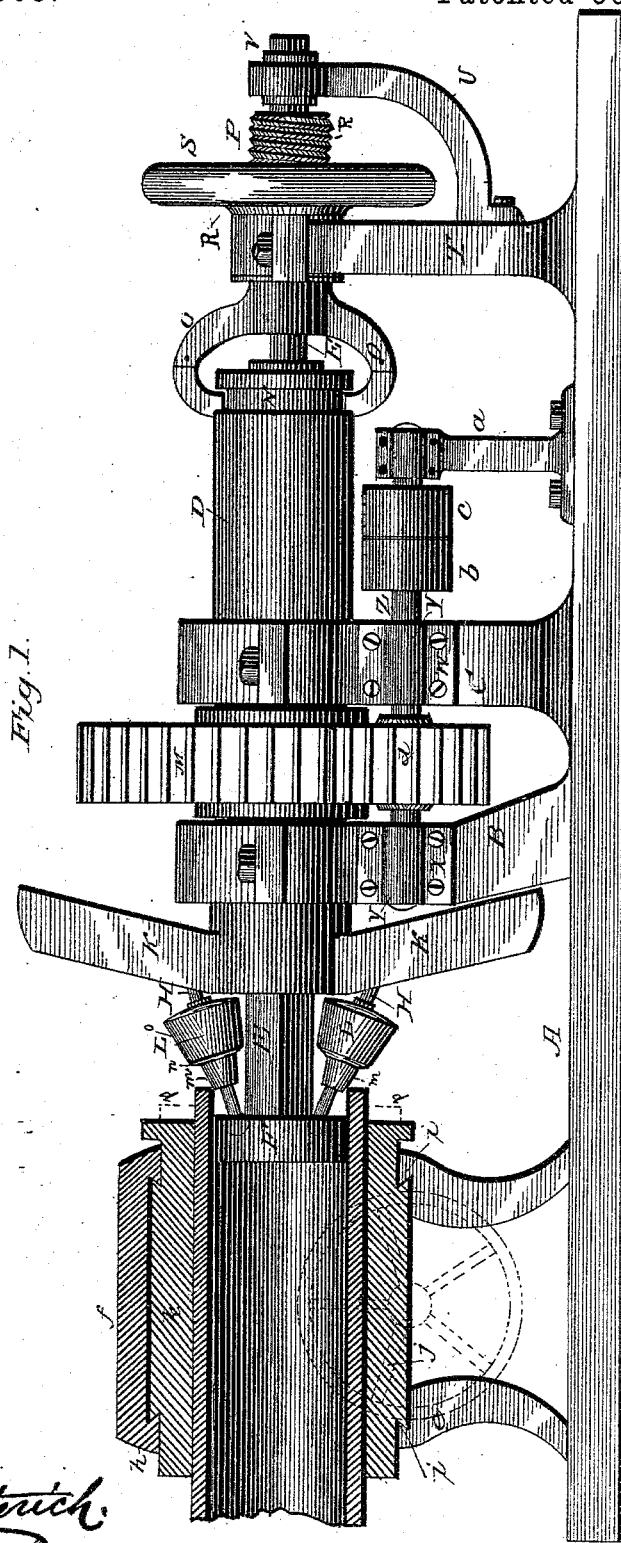

(No Model.)  3 Sheets—Sheet 1.

R. C. NUGENT.
MACHINE FOR FLANGING PIPES.

No. 286,569. Patented Oct. 9, 1883.

WITNESSES:
Fred. G. Dieterich.
J. G. Hinkel.

INVENTOR.
Richard C. Nugent
by A. C. Johnston
ATTORNEYS

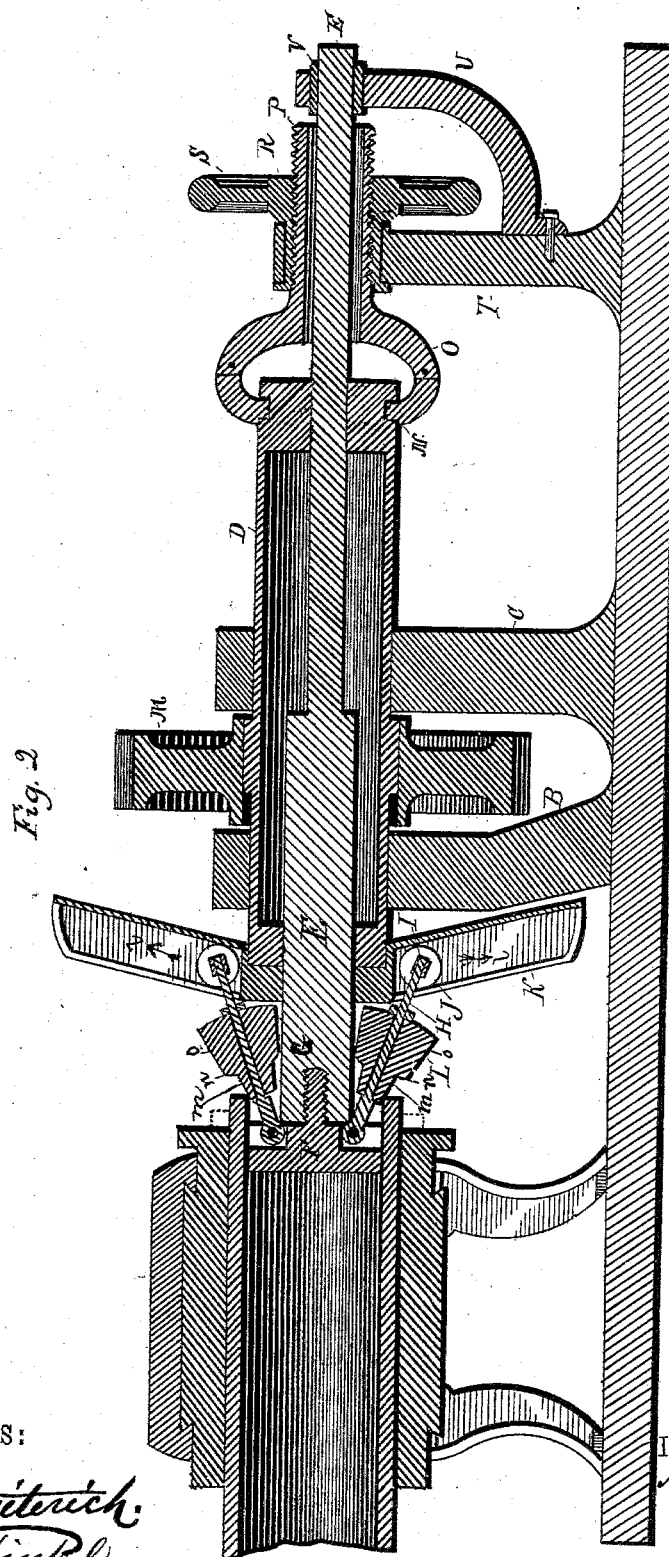

(No Model.)   3 Sheets—Sheet 3.
R. C. NUGENT.
MACHINE FOR FLANGING PIPES.
No. 286,569.   Patented Oct. 9, 1883.
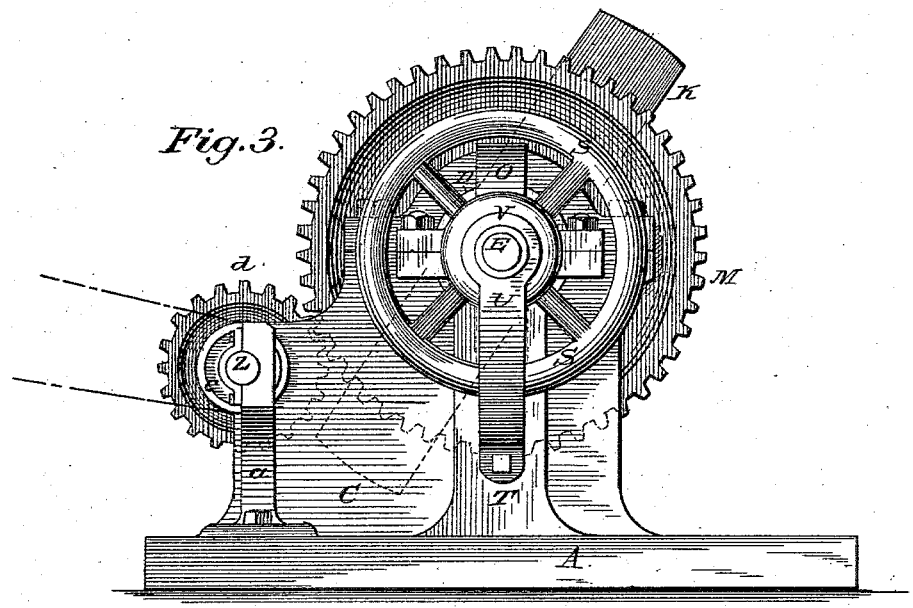
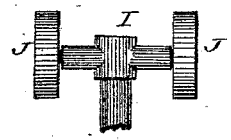
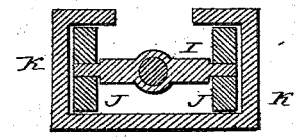
WITNESSES:
INVENTOR.
Richard C. Nugent
by A. C. Johnston
ATTORNEYS.

(No Model.)
W. L. SWEETEN.
COMBINED BAT AND BALL.
No. 286,570. Patented Oct. 9, 1883.
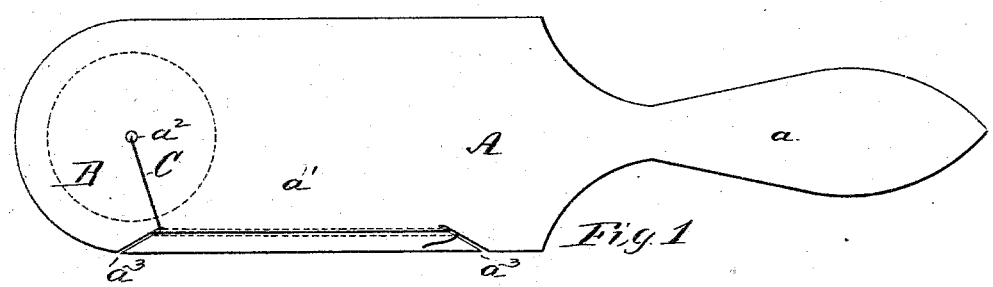
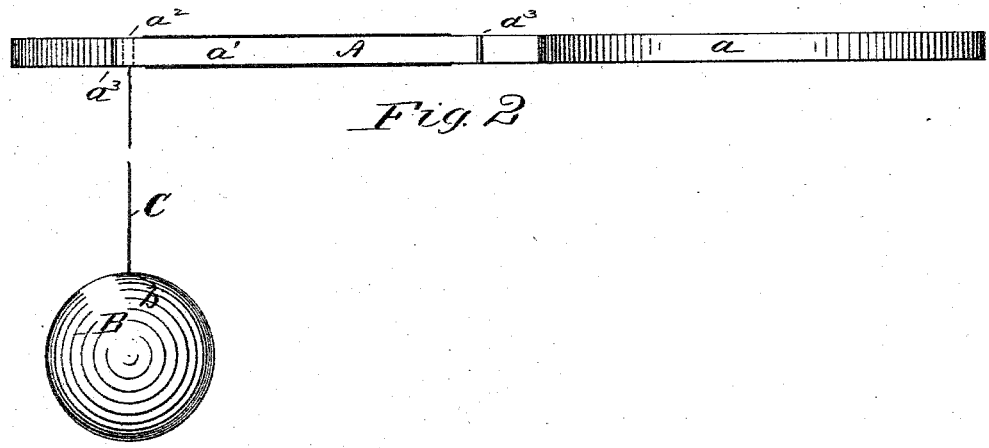
Witnesses:
Inventor: